(12) United States Patent
DeBerti et al.

(10) Patent No.: US 10,710,533 B2
(45) Date of Patent: Jul. 14, 2020

(54) PICKUP TRUCK BASEMENT BOX

(71) Applicants: Doug DeBerti, Arroyo Grande, CA (US); Brad DeBerti, Arroyo Grande, CA (US)

(72) Inventors: Doug DeBerti, Arroyo Grande, CA (US); Brad DeBerti, Arroyo Grande, CA (US)

( * ) Notice: Subject to any disclaimer, the term of this patent is extended or adjusted under 35 U.S.C. 154(b) by 0 days.

(21) Appl. No.: 16/690,345

(22) Filed: Nov. 21, 2019

(65) Prior Publication Data

US 2020/0156549 A1    May 21, 2020

Related U.S. Application Data

(60) Provisional application No. 62/770,693, filed on Nov. 21, 2018.

(51) Int. Cl.
*B60R 19/48* (2006.01)
*B60R 5/04* (2006.01)
*B60R 19/38* (2006.01)
*B62D 43/04* (2006.01)

(52) U.S. Cl.
CPC .............. *B60R 19/48* (2013.01); *B60R 5/041* (2013.01); *B60R 19/38* (2013.01); *B62D 43/045* (2013.01)

(58) Field of Classification Search
CPC ......... B60R 5/041; B60R 19/38; B60R 19/48; B62D 43/04; B62D 43/045
USPC .................................... 296/26.09, 37.2, 37.6
See application file for complete search history.

(56) References Cited

U.S. PATENT DOCUMENTS

| | | | | |
|---|---|---|---|---|
| 3,210,117 | A | * 10/1965 | Hall ...................... | B62D 43/04 296/37.2 |
| 3,554,415 | A | 1/1971 | Woods | |
| 3,682,360 | A | * 8/1972 | Fletcher ................. | B60R 19/48 224/491 |
| 4,312,620 | A | * 1/1982 | Muschalek, Jr. ...... | B62D 43/04 224/42.12 |
| 4,548,540 | A | * 10/1985 | Renfro ................. | B62D 43/045 206/304 |
| 4,676,415 | A | * 6/1987 | Kennedy ............... | B62D 43/04 224/42.21 |
| 4,733,898 | A | * 3/1988 | Williams .............. | B62D 33/02 224/404 |
| 5,135,274 | A | * 8/1992 | Dodd ..................... | B60R 11/06 224/491 |
| 5,575,509 | A | 11/1996 | Wood et al. | |
| 6,328,366 | B1 | * 12/2001 | Foster .................... | B60P 1/431 293/28 |
| 6,474,715 | B2 | * 11/2002 | Fukushima ............. | B60R 5/04 296/37.1 |

(Continued)

FOREIGN PATENT DOCUMENTS

DE    20316591 U1    3/2004

*Primary Examiner* — Jason S Morrow
(74) *Attorney, Agent, or Firm* — McKee, Voorhees & Sease, PLC

(57) ABSTRACT

A drawer assembly is provided for mounting beneath the bed of a truck and between the truck frame rails. The assembly includes a housing with an extendable and retractable drawer. The drawer is mounted to the rear bumper of the truck. The drawer can be opened manually, or alternatively, by remote control. The drawer assembly is hidden from view when closed and provides easy access for small objects when opened.

20 Claims, 9 Drawing Sheets

(56) References Cited

U.S. PATENT DOCUMENTS

| | | | |
|---|---|---|---|
| 6,561,489 B1* | 5/2003 | Wakefield | B62D 43/045 |
| | | | 224/42.23 |
| 6,644,707 B2 | 11/2003 | McLaughlin et al. | |
| 7,121,597 B2* | 10/2006 | Chuang | B60R 9/06 |
| | | | 293/117 |
| 7,218,745 B2* | 5/2007 | McConnell | B60R 11/0235 |
| | | | 381/152 |
| 2005/0140159 A1* | 6/2005 | Barber | B60P 3/14 |
| | | | 296/37.6 |
| 2010/0143085 A1* | 6/2010 | Tarabuso | B62D 43/045 |
| | | | 414/463 |
| 2014/0044509 A1* | 2/2014 | Pino | B62D 43/045 |
| | | | 414/463 |
| 2018/0072254 A1* | 3/2018 | Wymore | B60R 19/48 |
| 2020/0001793 A1* | 1/2020 | Lynch | B60R 9/06 |

* cited by examiner

PICKUP TRUCK BASEMENT BOX

CROSS-REFERENCE TO RELATED APPLICATIONS

This application claims priority to Provisional Application U.S. Ser. No. 62/770,693, filed on Nov. 21, 2018, which is herein incorporated by reference in its entirety.

FIELD OF THE INVENTION

The present invention is directed towards an enclosed storage compartment with an extendable/retractable drawer beneath the bed of a truck.

BACKGROUND OF THE INVENTION

Pick-up trucks provide ample cargo space in the bed of the truck, particularly for hauling large items and objects. In many trucks, the bed is open, without any cover, such that items in the bed are subject to weather exposure, as well as potential theft. Also, smaller items in the truck bed often slide around during driving and may require someone to climb into the bed to retrieve such items. Thus, there is a need for improved storage in a pick-up truck for small items.

Accordingly, a primary objective of the present invention is the provision of a storage compartment on a pick-up truck for small objects, with a compartment being moveable between an extended open position behind the truck tailgate and a retracted closed position beneath the truck bed.

Another objective of the present invention is the provision of a drawer assembly for pick-up truck which is enclosed and hidden from view when closed.

A further objective of the present invention is the provision of a drawer assembly for a pick-up truck which can be provided as original equipment or as an aftermarket retro-fit onto the truck.

Still another objective of the present invention is the provision of a storage box for a pick-up truck which mounts to the rails of the truck frame and to the rear bumper of the truck.

Another objective of the present invention is the provision of a pick-up truck basement storage box which slides or rolls between open and closed positions.

Still another objective of the present invention is the provision of a pick-up truck storage box beneath which the spare tire can be stored.

A further objective of the present invention is the provision of a drawer assembly beneath the bed of a pick-up truck which can be manually pulled and pushed between opened and closed positions, or alternatively, can be motorized for opening and closing with a switch in the truck cab or with a key fob.

Another objective of the present invention is the provision of a truck storage box which is economical to manufacture, and durable and safe in use.

These and other objectives will become apparent from the following description of the invention.

SUMMARY OF THE INVENTION

To install an aftermarket basement box the spare, trailer hitch (if present), and rear bumper are first removed. This allows the basement box to be installed as an after-market accessory. In alternative examples the basement box may be provided as an OEM accessory.

A drawer assembly is provided for a pickup truck to safely and securely hold small objects. The assembly includes a storage drawer or compartment extendable from and retractable into a box beneath the bed of a pickup truck. The protective box is typically made from steel, aluminum, or an equivalent material. The protective box may be made from suitably formed sheet material without reinforcement if the material is strong enough. Alternatively, reinforcing members or the like may be used to strengthen the protective box. The protective box encloses a cargo carrying bumper drawer and protects the contents from falling out and from the intrusion of dust, dirt, water and the like from damaging the cargo. The protective box is typically bolted to the frame, or equivalently to the bed, either directly or via auxiliary mounting hardware. The protective box is generally rectangular with an open rear end to accommodate the drawer which is coupled to the bumper.

The bumper drawer is slidably or rollably coupled to the protective box. The bumper drawer slides in and out of the protective box. The bumper drawer typically couples to the protective box via one or more drawer slides on the vertical sides of the protective box. Equivalently rollers or the like, with or without tracks may be mounted on the bottom or sides of the bumper drawer, or the bottom or sides of the protective box (either with or without tracks to guide the rollers). In further equivalent examples for light loads, the bumper drawer may simply lie in the protective box and be simply pulled out. The bumper drawer may be a box with a lid, a tray with sides, a simple platform or the like. The bumper drawer may form a single compartment or many compartments to segregate items stored therein. Alternatively, removable toolboxes and the like may be provided with mounting and latching mechanisms as accessories to prevent shifting during transit. In alternative examples, multiple trays may be provided to stack items like boards vertically.

The bumper is coupled to a drawer end that has a shape matching the opening in the protective box, so that when the bumper drawer is closed, the basement box forms an enclosure to protect the contents inside.

Sealing may be provided by a close mechanical fit, gasketing or the like. Coupling of the bumper to the box end may be by direct attachment, or equivalently via a mounting bracket kit or the like.

When opening the bumper drawer, an end stop may be provided to keep the bumper drawer from being pulled too far out. In equivalent examples, a rack riding against a spring biased dog may be present to provide pull out to a desired distance (before the end stop is reached) and locking the bumper drawer in position until the dog is released to further extend the drawer or push it back in to a closed position.

To keep the bumper drawer in place during transit, and for security, a latch couples the bumper drawer to the truck frame or equivalently to the protective box. A release mechanism allows the typically latched bumper drawer to be extended. To close the bumper drawer, the drawer is slid back into the protective box until the latch engages. The latch is typically a post and double clamshell type mechanism similar to that found in a vehicle door latch. Alternatively, a single clamshell latch, or its equivalent may be used. Latches may be present in one or more locations, such as at both sides of the protective box, or just at one side. The latch may be manually actuated or actuated through the action of a solenoid coupled to its opening mechanism. The solenoid may be actuated through the accessory wiring via a button (momentary contact switch) typically mounted in the cab or other desired location. Alternatively, the solenoid may be remotely activated via a key fob, or the like, when the doors are unlocked, or when other suitable conditions are desired. It is envisioned that other equivalent latching mechanisms may be provided to keep the bumper drawer secured.

DETAILED DESCRIPTION OF THE PREFERRED EMBODIMENTS

Figure 1:
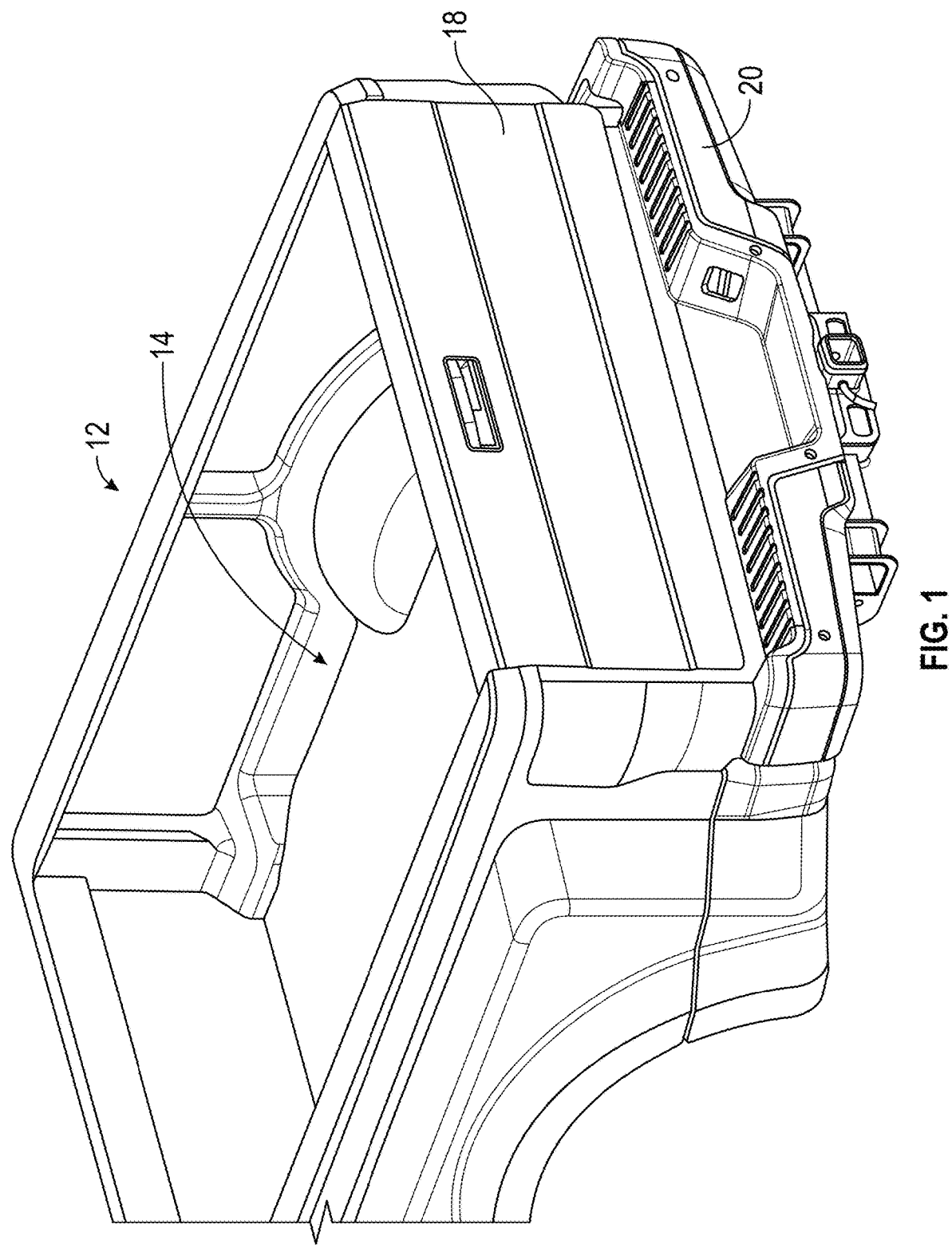
FIG. 1 is a perspective view of a pick-up truck bed and tailgate, with the drawer assembly of the present invention in a closed position.

The truck drawer assembly or storage box of the present invention is generally designated by the reference numeral 10 in the drawings. The drawer or box assembly 10 is designed for use on a pick-up truck 12, or other trucks having a bed 14, mounted on longitudinally extending frame rails 16. The truck may have a tailgate 18, though a tailgate is not required for the drawer or box assembly 10. The truck also has a rear bumper 20. The truck bed 14, frame rails 16, tailgate 18, and rear bumper 20 are conventional.

The drawer assembly 10 is mounted to the frame rails 16 of the truck beneath the bed 14. More particularly, the assembly 10 includes a housing or box 22 having a top 24, a bottom 26, opposite sides 28, a front end 30, and a rear end 32. The walls of the top 24, the bottom 26, the sides 28, and the front end 30 form an enclosure with the rear end 32 being open. A storage drawer or compartment 34 is sized to fit within the housing 22 and can be moved between a retracted closed position (FIG. 1) and an extended open position (FIG. 2). The housing 22 and the drawer 34 are coupled with the male/female track system 36 on each of the opposite sides. For example, the housing 22 may have guide tracks 38 which slidably or rollably support guide rails 40 on the opposite sides of the drawer 34.

The housing 22 includes forward mounting brackets or plates 42 and rearward mounting brackets or plates 44 on the opposite sides 28 of the housing. In the preferred embodiment, the forward brackets 42 mount to the bottom of the truck frame rails 16, and the rearward mounting brackets 44 mount to the tops of the truck frame rails 16. The brackets 42, 44 can be bolted, welded, or otherwise secured to the frame rails 16. The rearward end of the drawer 34 also has opposite side brackets or plates 46 which are bolted or otherwise attached to the bumper 20. Preferably, the bumper brackets 46 receive the conventional bolts 48 which are normally used to mount the bumper 20 to the truck 12.

The drawer assembly 10 also utilizes the conventional spare tire hardware for mounting a spare tire (not shown) to the bottom of the assembly. For example, a spare tire winch 50 is mounted to the front end 30 of the drawer assembly 10. A conventional winch cable 52 extends from the winch 50 and around or over a pulley or roller 54 mounted on the bottom 26 of the housing 22. The free end of the cable 52 extends downwardly from the pulley 54 and terminates in a bar or other mechanism to support the spare tire. The winch 50 can be actuated to raise and lower the cable, thereby raising and lowering the spare tire, as is known in the art.

Figure 2:
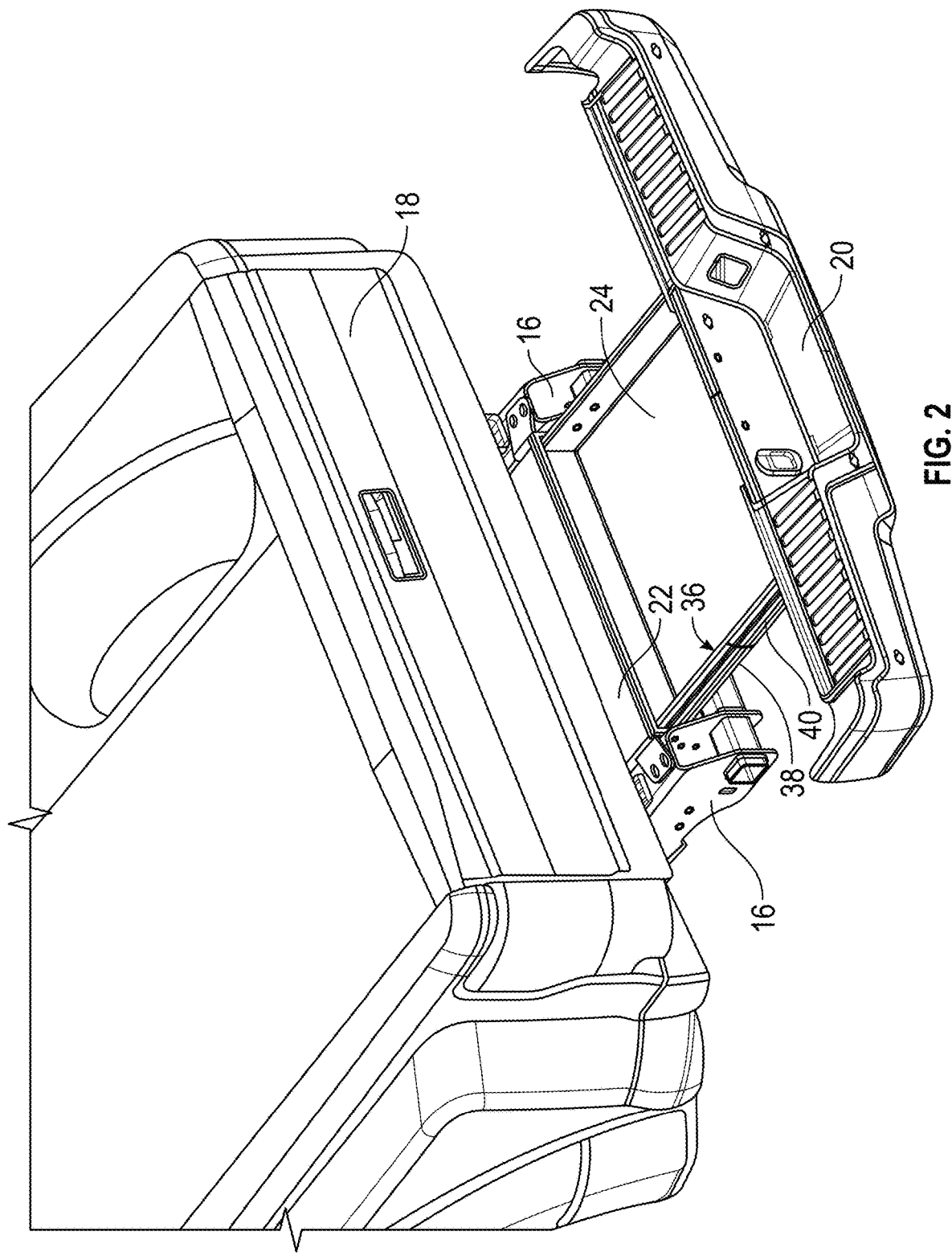
FIG. 2 is a perspective view like FIG. 1 showing the drawer assembly in an opened position.
Figure 3:
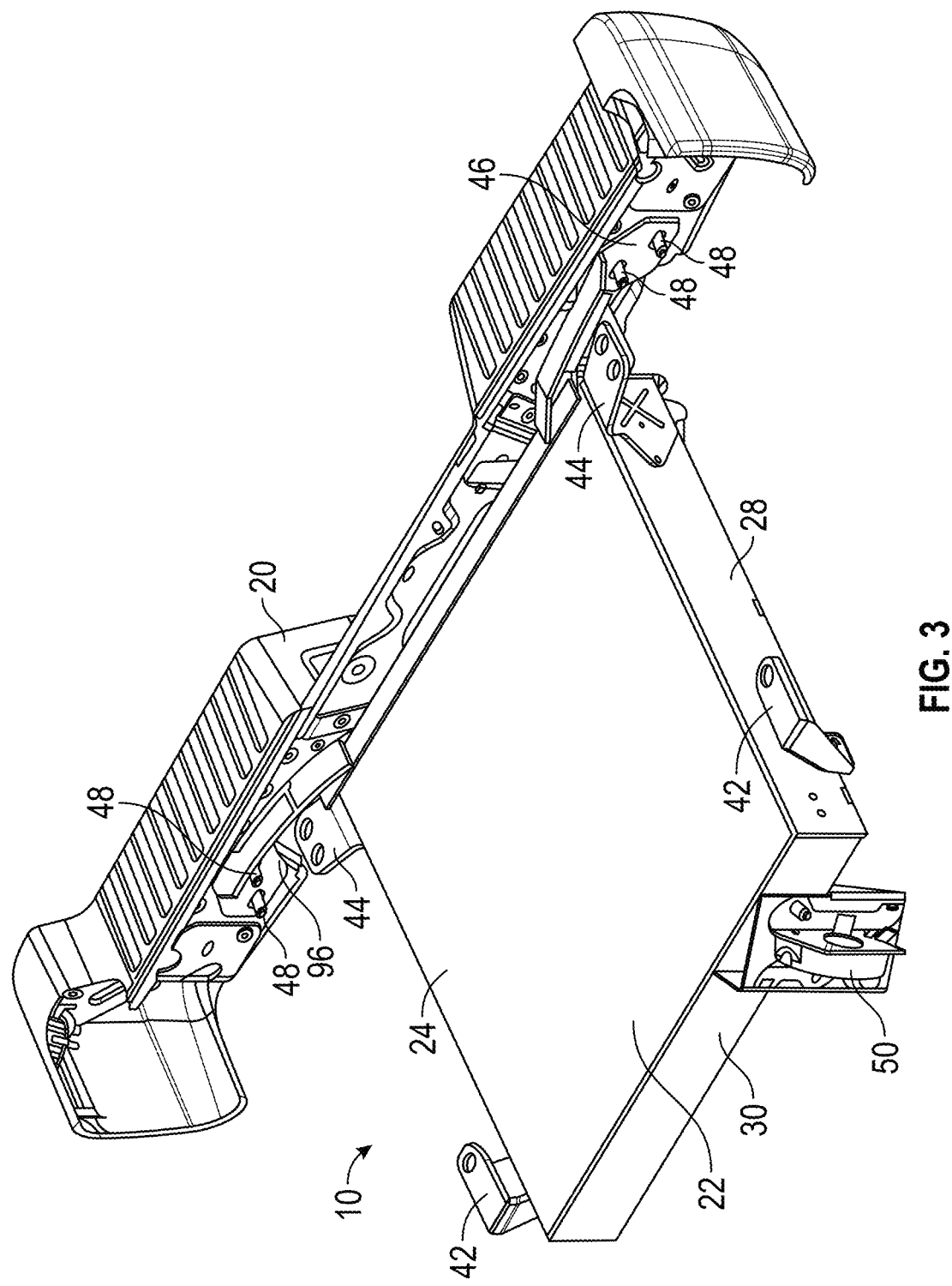
FIG. 3 is a perspective view of the drawer assembly of the present invention mounted to the rear bumper and in a closed position.
Figure 4:
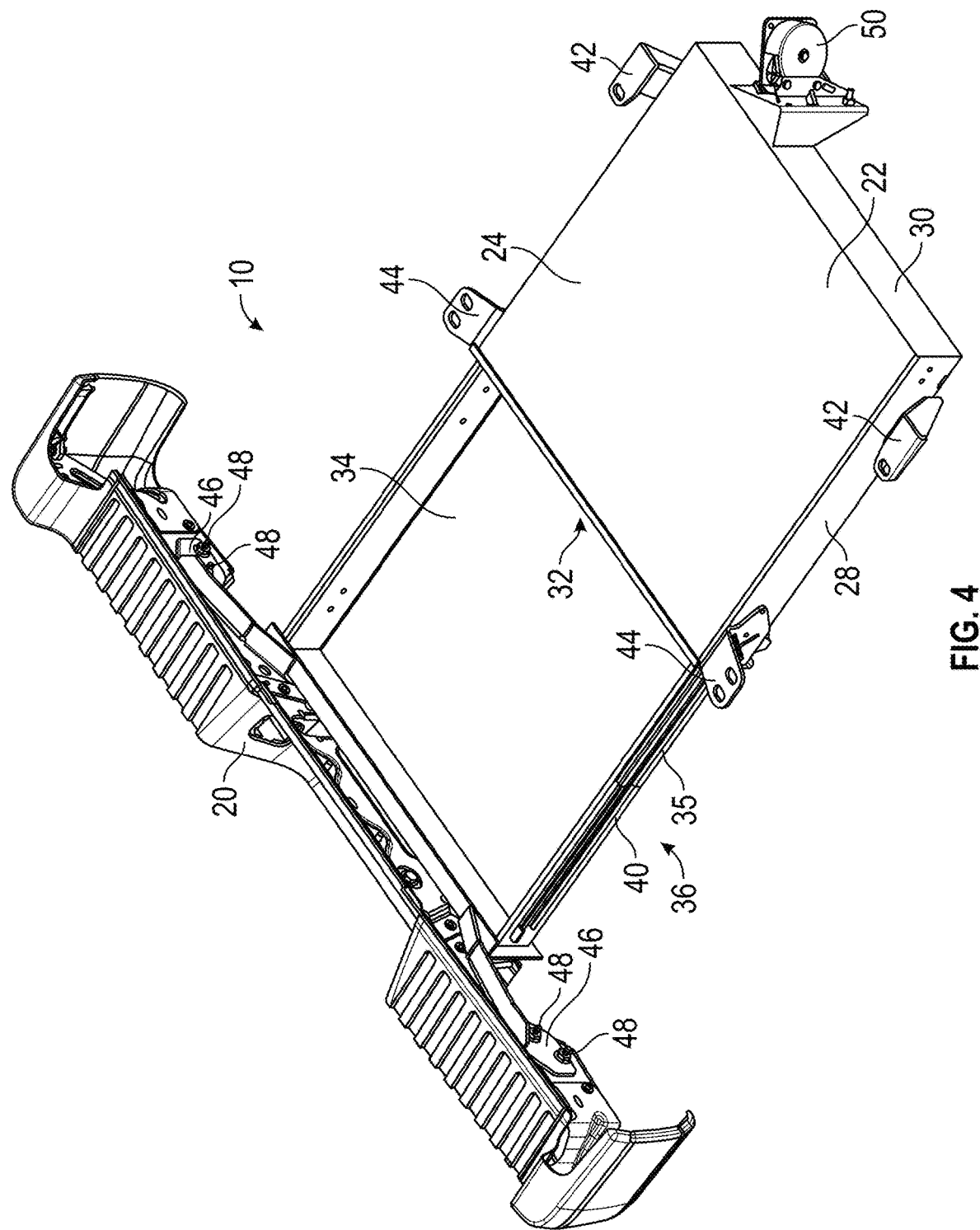
FIG. 4 is another perspective view of the drawer assembly mounted to the bumper and in the open position.
Figure 5:
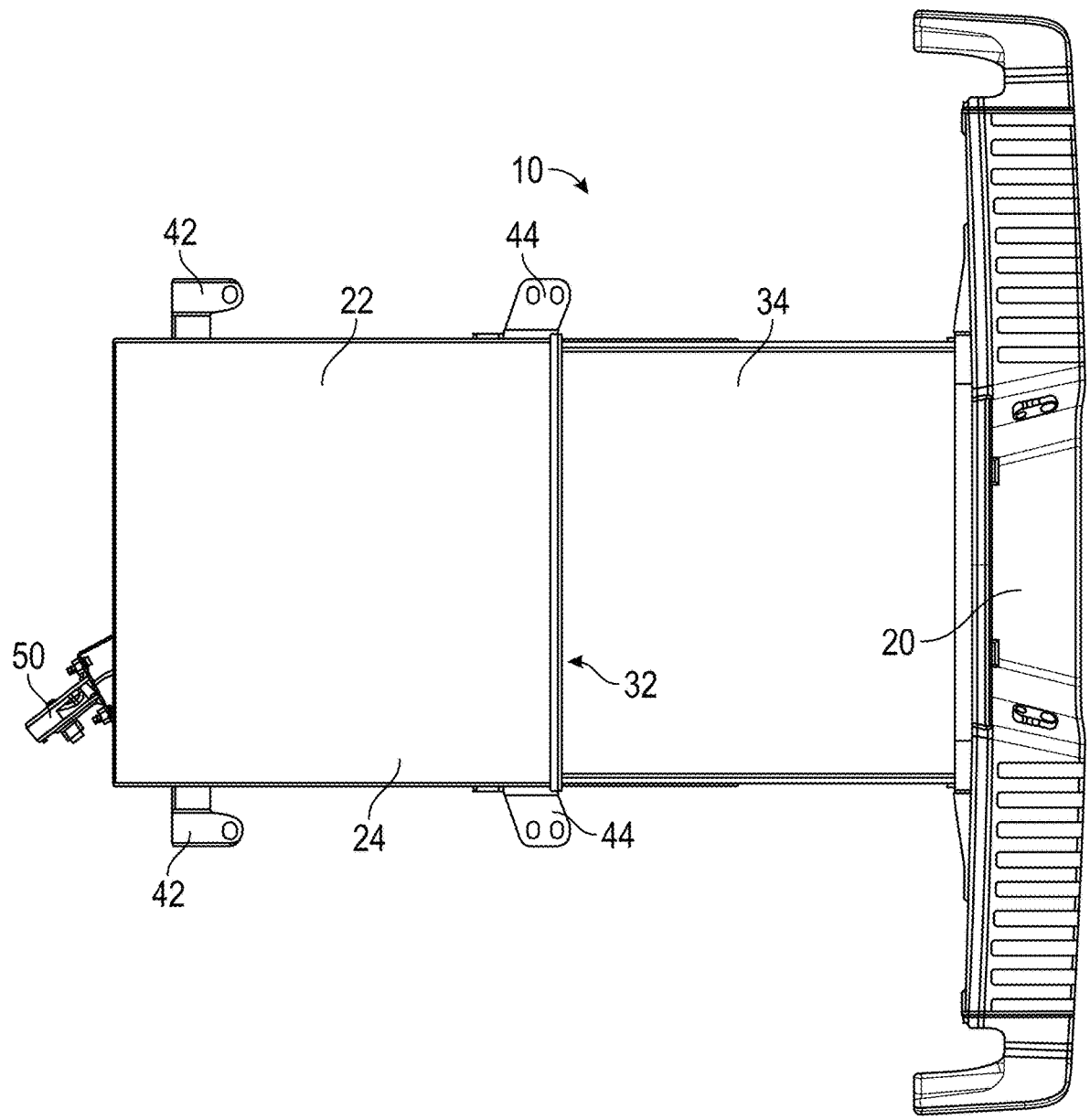
FIG. 5 is a top plan view of the drawer assembly in an open position.
Figure 6:
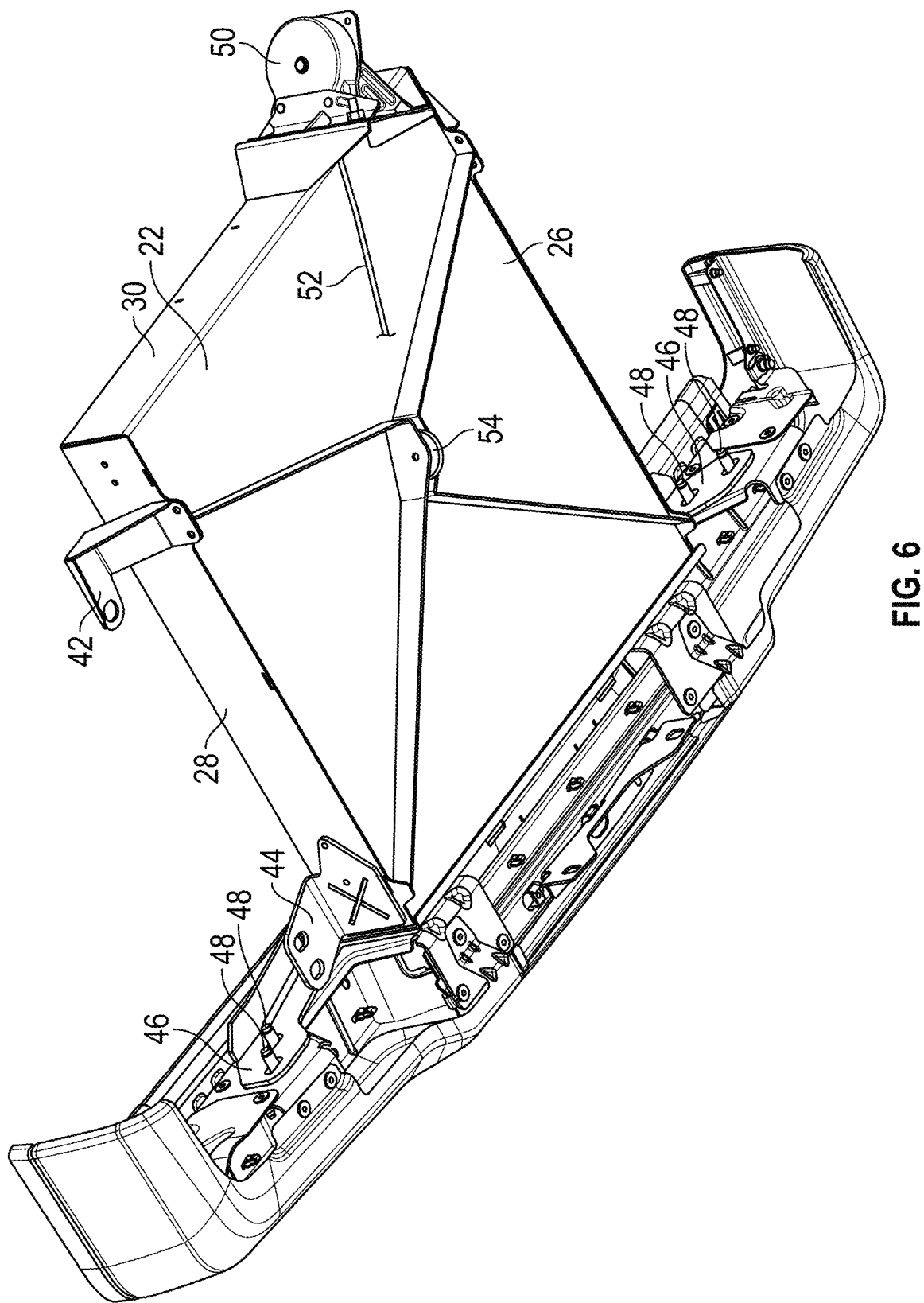
FIG. 6 is bottom perspective view of the drawer assembly mounted to the rear bumper, and in a closed position.
Figure 7:
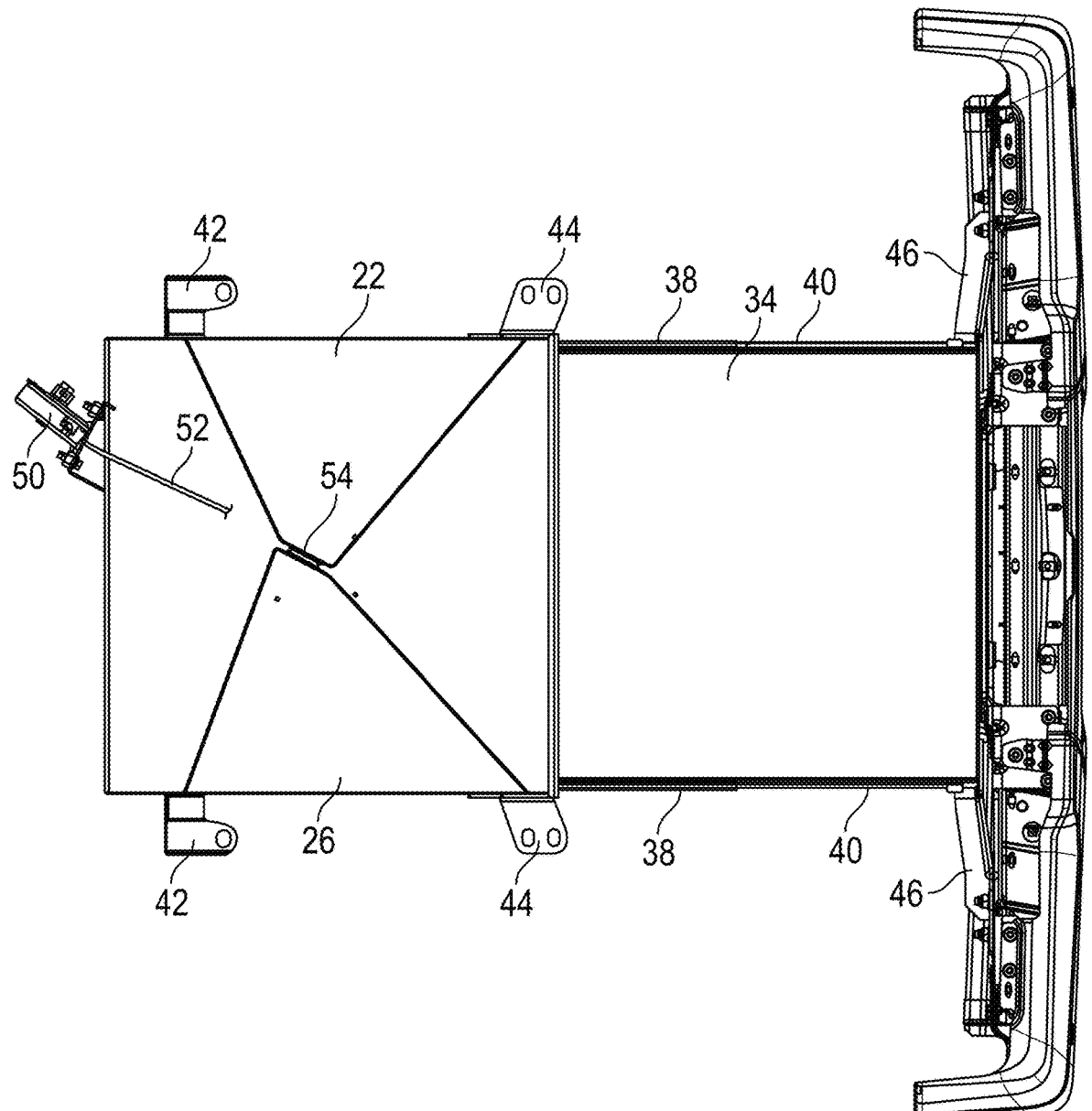
FIG. 7 is a bottom plan view of the drawer assembly mounted to the rear bumper, and in an open position.
Figure 8:
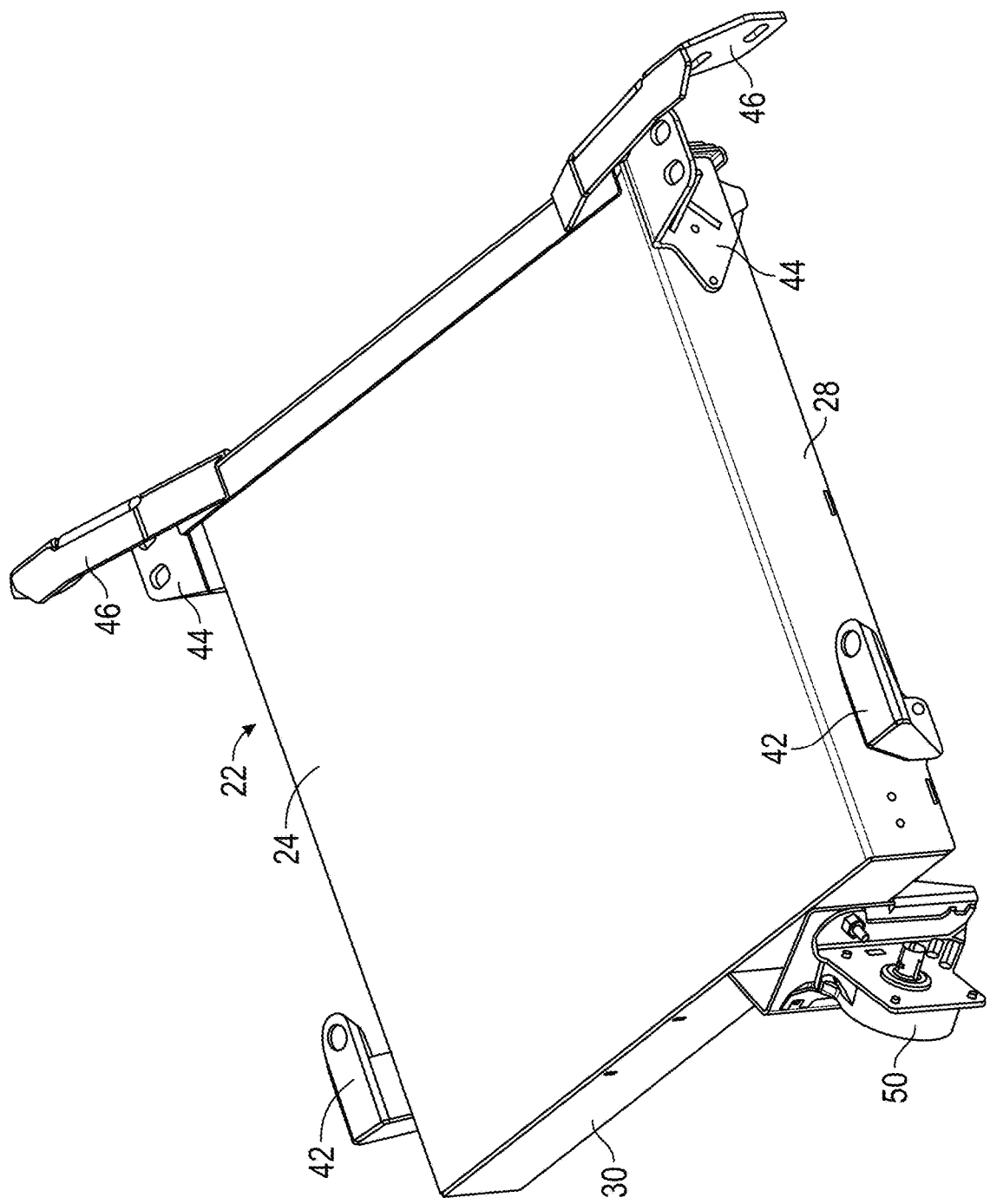
FIG. 8 is an upper perspective view of the drawer assembly in a closed position.
Figure 9:
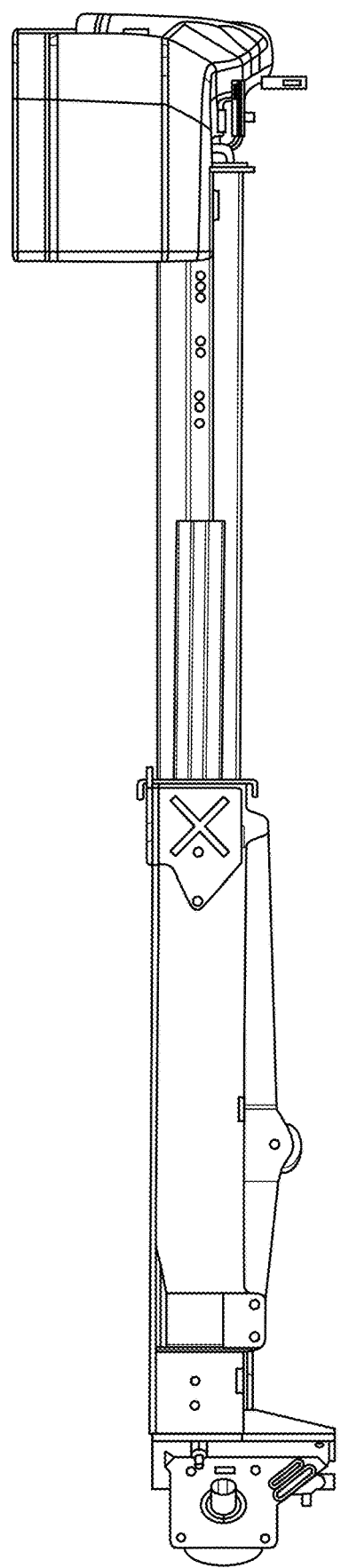
FIG. 9 is a side elevation view of the drawer assembly attached to the rear bumper and in an open position.

In one embodiment, the drawer or compartment 34 can be withdrawn from the housing 22 by pulling on the bumper 20 to the open position shown in FIG. 2, and can be moved to the closed position inside the housing 22 by pushing on the bumper 20, as shown in FIG. 1. Alternatively, the drawer or compartment 34 can be motorized or have a linear actuator which can be controlled by a switch in the truck cab or by a key fob for opening and closing the drawer 34. Also, a latch (not shown) may be provided on the drawer 34 to prevent accidental opening of the drawer. A lock may also be provided on the drawer assembly 10 to prevent access to the contents of the drawer 34.

The drawer 34 may also include dividing walls to form smaller compartments. When the drawer assembly 10 is closed, the contents are protected from the weather, and are hidden from view beneath the truck bed. When the drawer assembly is opened, a person can access the compartment 34 from behind the bumper 20 or from either side between the bumper and the tailgate 18.

The drawer assembly 10 fits between the existing frame rails 16 of the truck 12 and uses the factory bumper 20. The drawer assembly may have various dimensions. Also, weather stripping or seals may be be provided on the housing 22 and/or the drawer 34 to prevent moisture from entering the drawer. By positioning the assembly 10 beneath the bed and between the rails 16, a "basement" storage compartment provides additional storage for smaller objects, either as an OEM or aftermarket component for the truck 12.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A drawer assembly for a pick-up truck having laterally spaced frame members, a bed mounted on the frame members, and a rear bumper, the drawer assembly comprising:
   a box having a closed top, a closed bottom, closed opposite sides, a closed forward end, and an open rearward end, the box being mountable to the truck beneath the bed and between the frame members;
   a drawer attachable to the rear bumper for longitudinal movement into and out of the box through the open rear end of the box;
   the box includes brackets for mounting to the truck frame members and the drawer includes brackets for mounting to the rear bumper; and
   whereby the rear bumper moves rearwardly to open the drawer and moves forwardly to close the drawer.

2. The drawer assembly of claim 1 wherein the drawer has a bottom opposite sides, opposite front and rear ends, and an open top.

3. The drawer assembly of claim 2 wherein the box encloses the drawer when the drawer is closed.

4. The drawer assembly of claim 1 wherein the box includes opposite side tracks and the drawer includes opposite side rails for mating with the tracks.

5. The drawer assembly of claim 4 further comprising rollers on the tracks or on the rails.

6. The drawer assembly of claim 1 wherein the box brackets extend laterally outwardly to engage the frame members and the drawer brackets extend rearwardly to engage the bumper.

7. The drawer assembly of claim 1 wherein the drawer brackets include rear tabs to engage the bumper and to receive bolts on the rear bumper to mount the drawer to the rear bumper.

8. The drawer assembly of claim 1 further comprising a spare tire support system on the box to removably mount a spare tire below the box.

9. The drawer assembly of claim 8 wherein the spare tire support system includes a winch on the box.

10. A drawer assembly for a truck having longitudinal frame members, a bed on top of the frame members, and a rear bumper, the drawer assembly comprising:
a drawer connected to the rear bumper;
a housing residing between the frame members and beneath the bed;
the drawer includes rear plates for mounting to the rear bumper; and
the drawer and bumper being longitudinally movable from a rearwardly open position wherein the draw and bumper are spaced behind the bed and a forwardly closed position wherein the drawer is inside the housing and the bumper is adjacent the bed.

11. The drawer assembly of claim 10 wherein the housing includes side plates for mounting the housing to the frame members.

12. The drawer assembly of claim 10 wherein the drawer and the housing are sealed when the drawer is in the closed position.

13. The drawer assembly of claim 10 wherein drawer is mounted to tracks on opposite sides of the housing.

14. The drawer assembly of claim 10 wherein the drawer is slidably mounted to the housing.

15. The drawer assembly of claim 10 wherein the drawer is rollably mounted to the housing.

16. The drawer assembly of claim 10 further comprising a tire support on a portion of the housing to hold a spare tire beneath the housing.

17. The drawer assembly of claim 16 wherein the tire support includes a winch.

18. The drawer assembly of claim 10 wherein the drawer and housing form an enclosure for objects in the drawer.

19. A drawer assembly for a truck having longitudinal frame members, a bed on top of the frame members, and a rear bumper, the drawer assembly comprising:
a drawer connected to the rear bumper;
a housing residing between the frame members and beneath the bed;
the housing includes side plates for mounting the housing to the frame members; and
the drawer and bumper being longitudinally movable from a rearwardly open position wherein the draw and bumper are spaced behind the bed and a forwardly closed position wherein the drawer is inside the housing and the bumper is adjacent the bed.

20. The drawer assembly of claim 19 further comprising a tire support on a portion of the housing to hold a spare tire beneath the housing.

* * * * *